(12) United States Patent
Niewiadomski et al.

(10) Patent No.: US 12,017,667 B2
(45) Date of Patent: *Jun. 25, 2024

(54) ASSISTED HITCHING SYSTEM WITH HANDOFF PROCESS FOR INTERRUPTED OPERATION

(71) Applicant: Ford Global Technologies, LLC, Dearborn, MI (US)

(72) Inventors: Luke Niewiadomski, Dearborn, MI (US); Roger Trombley, Ann Arbor, MI (US); Arnav Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

This patent is subject to a terminal disclaimer.

(21) Appl. No.: 17/407,288

(22) Filed: Aug. 20, 2021

(65) Prior Publication Data
US 2021/0380120 A1   Dec. 9, 2021

Related U.S. Application Data

(63) Continuation of application No. 16/505,807, filed on Jul. 9, 2019, now Pat. No. 11,124,201.

(51) Int. Cl.
*B60W 50/029* (2012.01)
*B60D 1/06* (2006.01)
(Continued)

(52) U.S. Cl.
CPC ........ *B60W 50/029* (2013.01); *B60W 10/182* (2013.01); *B60W 10/20* (2013.01);
(Continued)

(58) Field of Classification Search
CPC .. B60D 1/06; B60D 1/36; B60D 1/62; B60W 10/182; B60W 10/20; B60W 2420/42; B60W 2520/10; B60W 2540/16; B60W 2540/18; B60W 2540/215; B60W 2710/188; B60W 2710/20; B60W 30/09; B60W 50/0098; B60W 50/0205;
(Continued)

(56) References Cited

U.S. PATENT DOCUMENTS 8,138,899 B2   3/2012   Ghneim
8,191,915 B2   6/2012   Freese, V et al.
(Continued)

*Primary Examiner* — Babar Sarwar
(74) *Attorney, Agent, or Firm* — Lorne Forsythe; Price Heneveld LLP

(57) ABSTRACT

A hitching assistance system for a vehicle includes a steering system including a vehicle steering wheel and a controller executing an automated hitching maneuver including controlling the steering system to back the vehicle toward a trailer, monitoring the hitching assistance system for an interruption event affecting execution of the automated hitching maneuver, detecting the interruption event and identifying the interruption event as one of a standard interruption event or an exception interruption event, upon identifying the standard interruption event, causing the steering wheel to move to a centered position and ceasing control of the steering system, and upon identifying the exception interruption event, ceasing control of the steering system without causing the steering wheel to move to the centered position.

20 Claims, 12 Drawing Sheets

(51) Int. Cl.
  *B60D 1/36*     (2006.01)
  *B60W 10/18*    (2012.01)
  *B60W 10/20*    (2006.01)
  *B60W 30/09*    (2012.01)
  *B60W 50/00*    (2006.01)
  *B60W 50/02*    (2012.01)
  *B60W 50/10*    (2012.01)
  *B60W 50/14*    (2020.01)

(52) U.S. Cl.
  CPC ........ *B60W 30/09* (2013.01); *B60W 50/0098* (2013.01); *B60W 50/0205* (2013.01); *B60W 50/10* (2013.01); *B60W 50/14* (2013.01); *B60D 1/06* (2013.01); *B60D 1/36* (2013.01); *B60W 2420/403* (2013.01); *B60W 2520/10* (2013.01); *B60W 2540/16* (2013.01); *B60W 2540/18* (2013.01); *B60W 2540/215* (2020.02); *B60W 2710/188* (2013.01); *B60W 2710/20* (2013.01)

(58) Field of Classification Search
  CPC .... B60W 50/029; B60W 50/10; B60W 50/14; B62D 15/0285
  See application file for complete search history.

(56) References Cited

U.S. PATENT DOCUMENTS

| | | | | |
|---|---|---|---|---|
| 9,233,710 | B2 * | 1/2016 | Lavoie | B62D 13/06 |
| 9,340,228 | B2 | 5/2016 | Xu et al. | |
| 9,342,074 | B2 | 5/2016 | Dolgov et al. | |
| 9,446,713 | B2 | 9/2016 | Lu et al. | |
| 9,493,187 | B2 | 11/2016 | Pilutti et al. | |
| 9,499,200 | B2 | 11/2016 | Hochrein et al. | |
| 9,533,683 | B2 | 1/2017 | Lavoie | |
| 9,555,832 | B2 | 1/2017 | Smit et al. | |
| 9,751,558 | B2 | 9/2017 | Lavoie et al. | |
| 9,914,333 | B2 | 3/2018 | Shank et al. | |
| 9,926,008 | B2 | 3/2018 | Hafner et al. | |
| 9,950,738 | B2 | 4/2018 | Lu et al. | |
| 10,035,457 | B2 * | 7/2018 | Singh | B62D 15/025 |
| 10,059,346 | B2 | 8/2018 | Miller et al. | |
| 10,384,605 | B1 * | 8/2019 | Golgiri | B62D 15/0285 |
| 10,384,612 | B2 | 8/2019 | Bochenek | |
| 10,780,752 | B1 * | 9/2020 | Niewiadomski | B60D 1/62 |
| 10,814,912 | B2 | 10/2020 | Cotter et al. | |
| 10,906,583 | B2 | 2/2021 | Li et al. | |
| 2008/0231701 | A1 * | 9/2008 | Greenwood | G06T 7/0008 348/148 |
| 2010/0096203 | A1 * | 4/2010 | Freese V | B62D 15/0285 701/37 |
| 2011/0001614 | A1 * | 1/2011 | Ghneim | G06F 3/0481 382/103 |
| 2013/0226390 | A1 * | 8/2013 | Luo | B60D 1/36 348/148 |
| 2014/0012465 | A1 * | 1/2014 | Shank | B60D 1/58 701/36 |
| 2014/0085472 | A1 * | 3/2014 | Lu | B60R 1/28 348/148 |
| 2014/0151979 | A1 | 6/2014 | Puckett et al. | |
| 2014/0249723 | A1 * | 9/2014 | Pilutti | B60W 30/00 701/42 |
| 2014/0309888 | A1 * | 10/2014 | Smit | B60W 30/045 701/41 |
| 2015/0158527 | A1 * | 6/2015 | Hafner | B60D 1/245 701/41 |
| 2015/0197282 | A1 * | 7/2015 | Hochrein | B62D 15/027 701/41 |
| 2015/0321697 | A1 * | 11/2015 | Lu | B60C 9/005 701/28 |
| 2016/0052548 | A1 * | 2/2016 | Singh | B62D 15/028 701/41 |
| 2016/0075281 | A1 * | 3/2016 | Singh | B60G 17/015 348/118 |
| 2016/0101810 | A1 * | 4/2016 | Xu | G01B 21/22 701/41 |
| 2016/0159347 | A1 * | 6/2016 | Lavoie | B60W 50/14 701/29.2 |
| 2016/0280258 | A1 * | 9/2016 | Lavoie | B62D 5/0481 |
| 2017/0050567 | A1 * | 2/2017 | Bochenek | G06F 3/04842 |
| 2018/0208241 | A1 * | 7/2018 | Shepard | B62D 13/06 |
| 2018/0251153 | A1 * | 9/2018 | Li | G05D 1/0225 |
| 2019/0086927 | A1 * | 3/2019 | Skvarce | B60D 1/06 |
| 2019/0308473 | A1 * | 10/2019 | Yu | B60W 50/0098 |
| 2019/0366929 | A1 * | 12/2019 | Maruoka | H04N 7/18 |
| 2020/0148256 | A1 * | 5/2020 | Brimmer | B62D 15/025 |
| 2020/0164919 | A1 * | 5/2020 | Cotter | B60R 1/26 |
| 2021/0009143 | A1 | 1/2021 | Niewiadomski et al. | |

* cited by examiner

ASSISTED HITCHING SYSTEM WITH HANDOFF PROCESS FOR INTERRUPTED OPERATION

CROSS REFERENCE TO RELATED APPLICATION

The present application is a Continuation of U.S. patent application Ser. No. 16/505,807, now U.S. Pat. No. 11,124,201, filed on Jul. 9, 2019, and entitled "ASSISTED HITCHING SYSTEM WITH HANDOFF PROCESS FOR INTERRUPTED OPERATION," the entire disclosure of which is incorporated herein by reference in its entirety.

FIELD OF THE INVENTION

The present invention generally relates to a system for assisting in a vehicle-trailer hitching operation. In particular, the present disclosure relates to a system with improved process for system acquisition and handoff of steering system control.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause unintended contact between the vehicle with the trailer. Accordingly, further advancements may be desired.

SUMMARY OF THE INVENTION

According to one aspect of the present disclosure, a vehicle hitching assistance system includes a steering system including a vehicle steering wheel, a powertrain control system including an accelerator and a gear selector configuring the powertrain control system among park, drive, and reverse modes, a brake system including service brakes for slowing the vehicle to a stop and a parking brake for maintaining the vehicle at a stop, and a controller. The controller executes an automated hitching maneuver including controlling the steering system, the powertrain control system and the brake system, monitors the system for an interruption event, and detects the interruption event and identifies the interruption event as one of a standard interruption event or an exception interruption event. Upon identifying the standard interruption event, the controller causes the steering wheel to move to a centered position, causes the gear selector to engage a park mode, engages the parking brake, and ceases control of the steering system, the powertrain control system and the brake system. Upon identifying the exception interruption event, the controller ceases control of the steering system, the powertrain control system, and the brake system without causing the steering wheel to move to the centered position.

Embodiments of the first aspect of the disclosure can include any one or a combination of the following features:
- the controller further, upon detecting the interruption event, classifies the one the interruption event as either a pause event or an abort event. If the interruption event is a pause event, the controller maintains an active state while waiting for a user-initiated resume request, and if the interruption event is an abort event, the controller enters a deactivated state including terminating the automated hitching maneuver;
- when receiving the user-initiated resume request, the controller acquires control of the steering system, powertrain control system, and brake system;
- the system further includes a door sensor, and the controller classifies the interruption event as a pause event based on any of user interference with the steering wheel, the user change in a configuration of the gear selector, or the door sensor indicating at least one of a plurality of vehicle doors being opened;
- the system further includes a system fault sensor, and the controller identifies the interruption event as an abort event based on any of user cancelation of the automated hitching maneuver or the system fault sensor identifying a system fault;
- the controller further does not cause the gear selector to engage a park mode, or engage the parking brake, upon identifying the exception interruption event based on the user-system input device indicating a user cancelation of the automated hitching maneuver;
- the system further includes a door sensor and a user-system input device, and the controller further engages the parking brake but does not cause the gear selector to engage the park mode, upon identifying the exception interruption event based one of the steering system indicating user interference with the steering wheel, the powertrain control system indicating a user change in a configuration of the gear selector, or the door sensor indicating at least one of a plurality of vehicle doors being opened;
- the system further includes a system fault sensor and a vehicle speed sensor, and the controller identifies the standard interruption event based on one of the vehicle speed sensor indicating a vehicle standstill condition prior to completion of the automated hitching maneuver or the system fault sensor identifying a system fault;
- while executing an automated hitching maneuver, the controller further causes disablement of a vehicle emergency braking system and a rear object detection system and, upon identifying one of the user interruption event or the system interruption event, the controller allows for reactivation of the vehicle emergency braking system and the rear object detection system;
- the steering system further includes steered vehicle wheels mounted on an exterior of the vehicle and a steering motor mechanically coupled with the steered vehicle wheels, and the controller controls the steering system while executing the automated hitching maneuver by controlling the steering motor and causes the steering wheel to move to the centered position by controlling the steering motor to move the steered wheels to zero-degree steering angle position;
- the system further includes an imaging system outputting image data, and executing an automated hitching maneuver including controlling the steering system, the powertrain control system and the brake system is carried out to move the vehicle into an aligned position, where a hitch ball mounted on the vehicle is aligned with a coupler of the trailer, including tracking a position of the coupler relative to the hitch ball in the image data.

According to another aspect of the present disclosure, a vehicle including a steering system including a steering wheel mounted in an interior of the vehicle, a powertrain control system including an accelerator and a gear selector configuring the powertrain control system among park, drive, and reverse modes, a brake system including service brakes for slowing the vehicle to a stop and a parking brake for maintaining the vehicle at a stop, and vehicle hitching assistance system including a controller. The controller executes an automated hitching maneuver including controlling the steering system, the powertrain control system and the brake system, monitoring the system for an interruption event, and detecting the interruption event and identifying the interruption event as one of a standard interruption event or an exception interruption event. Upon identifying the standard interruption event, the controller causes the steering wheel to move to a centered position, causes the gear selector to engage a park mode, engages the parking brake, and ceases control of the steering system, the powertrain control system and the brake system. Upon identifying the exception interruption event, the controller ceases control of the steering system, the powertrain control system and the brake system without causing the steering wheel to move to the centered position.

According to another aspect of the present disclosure, a method for assisting a vehicle in hitching with a trailer includes electronically controlling a steering system, a powertrain control system a brake system of the vehicle, monitoring at least one of the steering system, the powertrain control system indicating a user change in a configuration of the gear selector, a vehicle door sensor, a user-system input device, a system fault sensor, and a vehicle speed sensor for an interruption event; and detecting the interruption event and identifying the interruption event as one of a standard interruption event or an exception interruption event. Upon identifying the standard interruption event, the method includes causing the steering wheel to move to a centered position, causing the gear selector to engage a park mode, engaging the parking brake, and ceasing control of the steering system, the powertrain control system and the brake system. Upon identifying the exception interruption event, the method includes ceasing control of the steering system, the powertrain control system and the brake system without causing the steering wheel to move to the centered position.

According to another aspect of the present disclosure, a hitching assistance system for a vehicle includes a steering system including a vehicle steering wheel and a controller executing an automated hitching maneuver including controlling the steering system to back the vehicle toward a trailer, monitoring the hitching assistance system for an interruption event affecting execution of the automated hitching maneuver, detecting the interruption event and identifying the interruption event as one of a standard interruption event or an exception interruption event, upon identifying the standard interruption event, causing the steering wheel to move to a centered position and ceasing control of the steering system, and upon identifying the exception interruption event, ceasing control of the steering system without causing the steering wheel to move to the centered position.

According to another aspect of the present disclosure, a hitching assistance system for a vehicle includes a steering system having steered vehicle wheels mounted on an exterior of the vehicle, a steering motor mechanically coupled with the steered vehicle wheels, and a vehicle steering wheel coupled with at least one of the steering motor and the steered vehicle wheels. The system further includes a controller executing an automated hitching maneuver including controlling the steering system to back the vehicle toward a trailer, monitoring the hitching assistance system for an interruption requiring the automated hitching maneuver to be terminated, and upon identifying the interruption event requiring the automated hitching maneuver to be terminated, causing the steering wheel to move to a centered position by controlling the steering motor and ceasing control of the steering system.

According to another aspect of the present disclosure, a method for assisting a vehicle in hitching with a trailer includes electronically controlling a steering system of the vehicle, monitoring at least one of the steering system, a powertrain control system of the vehicle, a vehicle door sensor, a user-system input device, a system fault sensor, and a vehicle speed sensor for an interruption event, and detecting the interruption event and identifying the interruption event as one of a standard interruption event or an exception interruption event. Upon identifying the standard interruption event the controller causes a steering wheel of the vehicle to move to a centered position. Upon identifying the exception interruption event, the controller ceases control of the steering system without causing the steering wheel to move to the centered position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
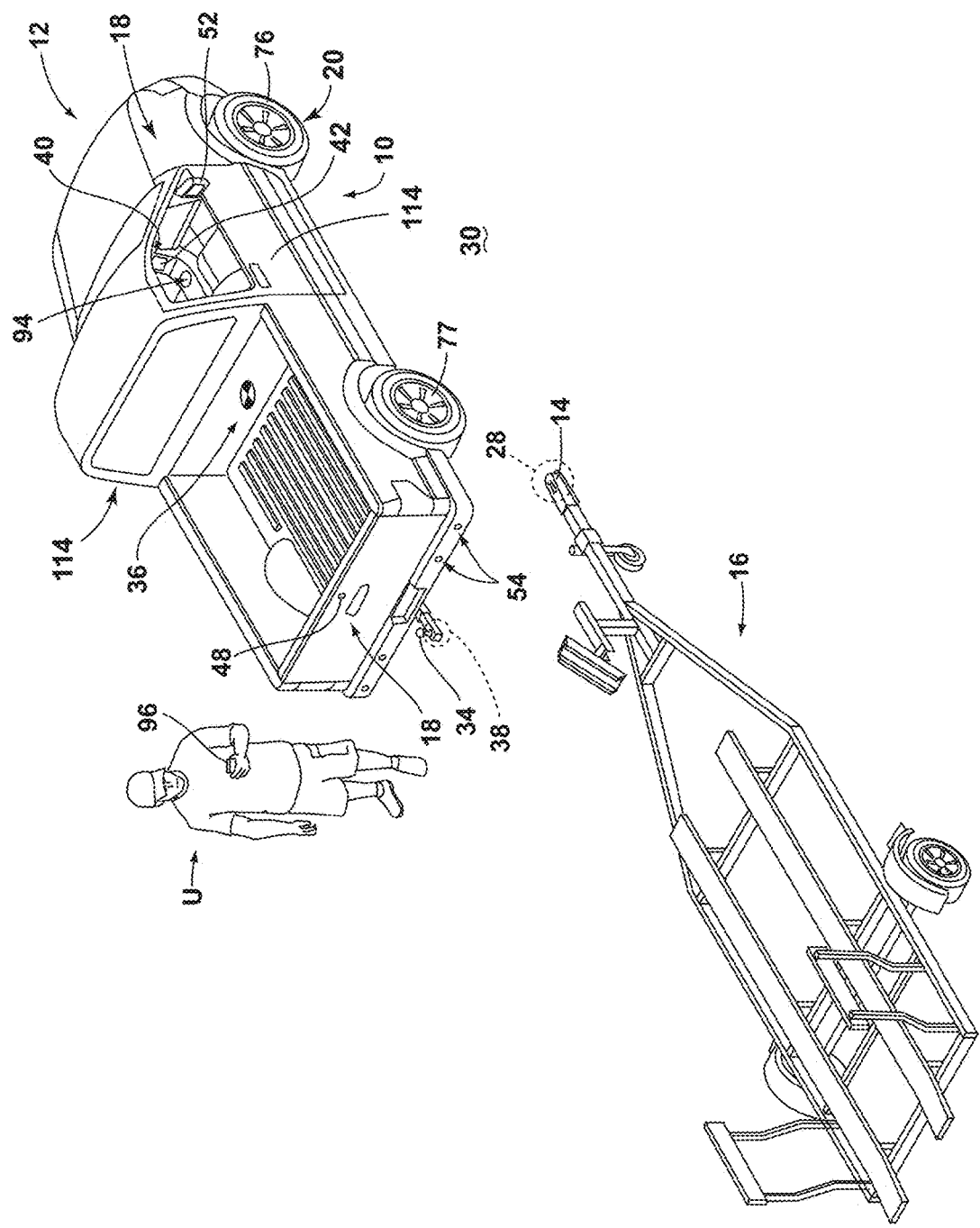
FIG. 1 is a is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-12C, reference numeral 10 designates a vehicle hitching assistance system. The system 10 includes a steering system 20 including a vehicle steering wheel 30, a powertrain control system 72 including an accelerator 73 and a gear selector 94 configuring the powertrain control system among park, drive, and reverse modes, a brake system 70 including service brakes 71 for slowing the vehicle to a stop and a parking brake 98 for maintaining the vehicle 12 at a stop, and a controller 26. The controller 26 executes an automated hitching maneuver including controlling the steering system 20, the powertrain control system 72 and the brake system 70, monitors the system 10 for an interruption event, and detects the interruption event and identifies the interruption event as one of a standard interruption event or an exception interruption event. Upon identifying the standard interruption event, the controller 26 causes the steering wheel 30 to move to a centered position, causes the gear selector 94 to engage a park mode, engages the parking brake 98, and ceases control of the steering system 20, the powertrain control system 72 and the brake system 70. Upon identifying the exception interruption event, the controller 26 ceases control of the steering system 20, the powertrain control system 70, and the brake system 70 without causing the steering wheel 30 to move to the centered position.

Figure 2:
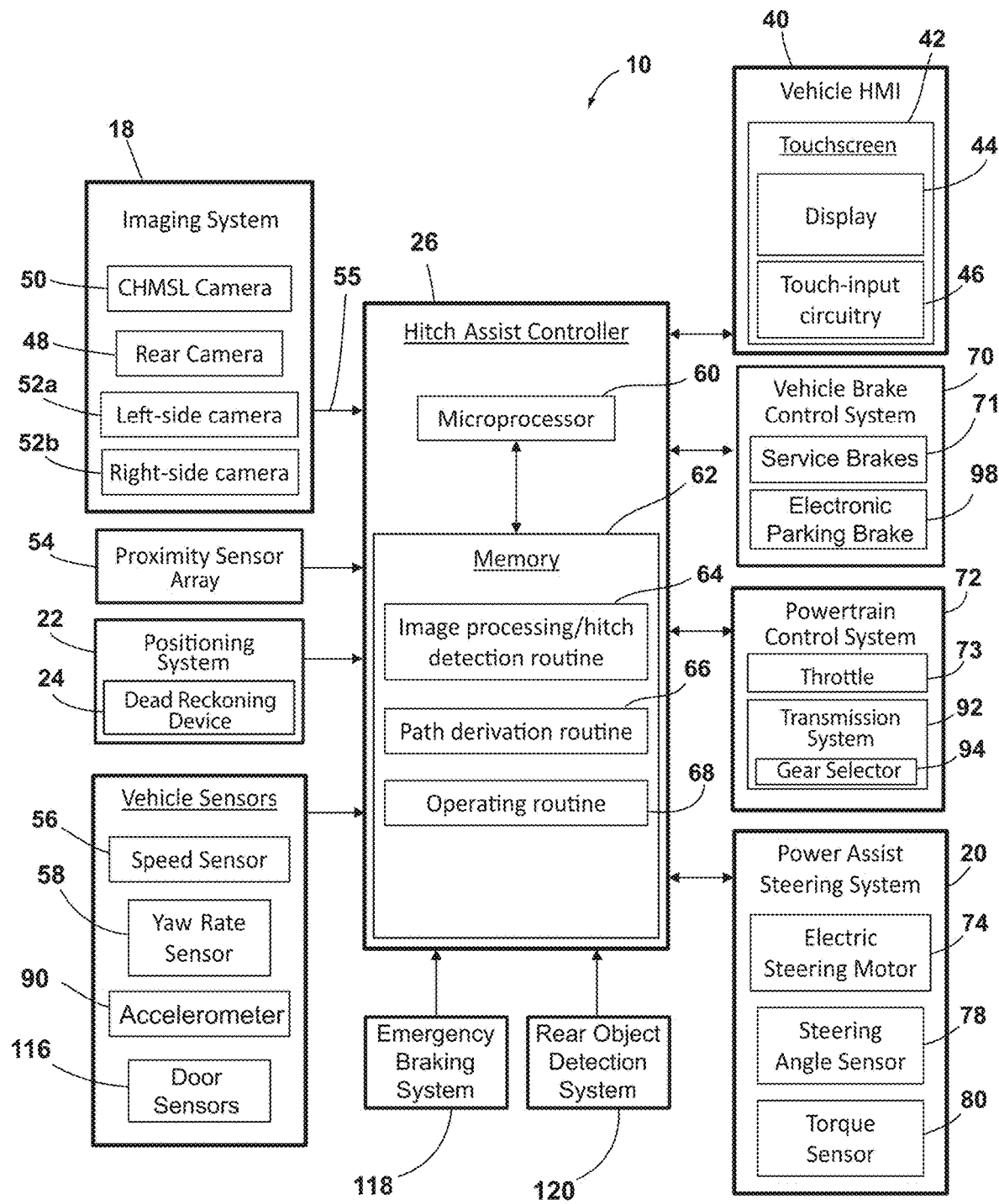
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $\alpha_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., turned angle) of a steering wheel 30 of vehicle 12. However, in the present example, the steering wheel 30 of the vehicle 12 is mechanically coupled with the steered wheels 76 of the vehicle 12, such that the steering wheel 30 moves in concert with steered wheels 76, preventing manual intervention with the steering wheel 30 during autonomous steering. More specifically, a torque sensor 80 is provided on the power assist steering system 20 that senses torque on the steering wheel 30 that is not expected from autonomous control of the steering wheel 30 and therefore indicative of manual intervention, whereby the hitch assist system 10 may alert the driver to discontinue manual intervention with the steering wheel 30 and/or discontinue autonomous steering. In alternative embodiments, some vehicles have a power assist steering system 20 that allows a steering wheel 30 to be partially decoupled from movement of the steered wheels 76 of such a vehicle.

Figure 3:
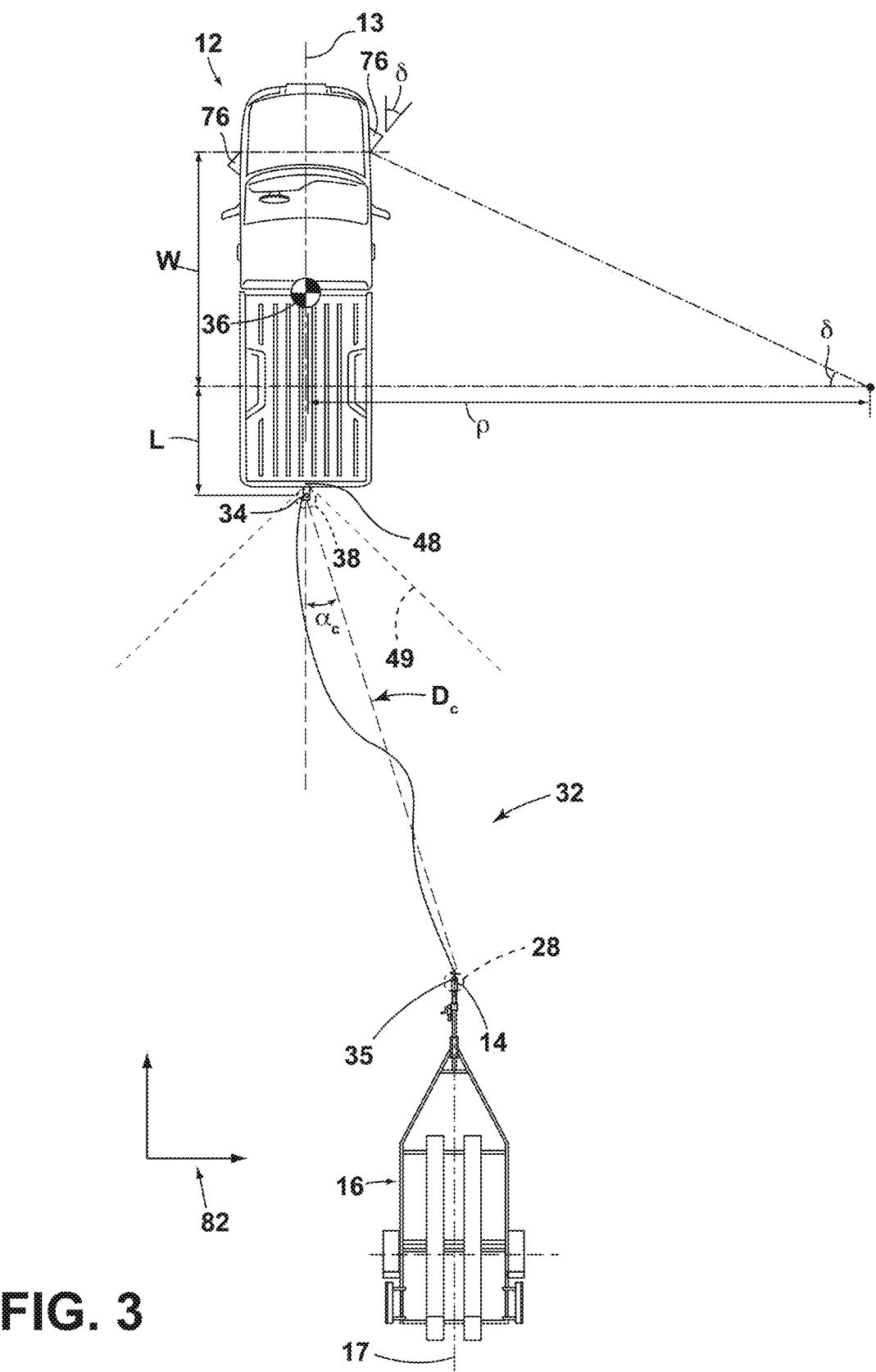
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate y, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for contact with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated contact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data from two or more of the cameras can be combined in image processing routine 64, or in another dedicated image processor within imaging system 18, into a single image. In an embodiment, the use of two images including the same object can be used to determine a location of the object relative to the two image sources, given a known spatial relationship between the image sources. In this respect, the image processing routine 64 can use known programming and/or functionality to identify an object within image data from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data. In an example, the image processing routine 64 can first attempt to identify any trailers 16 within the image data, which can be done based on stored or otherwise known visual characteristics of trailer 16, of a number of different types, sizes or configurations of trailers compatible with system 10, or trailers in general. Controller 26 can seek confirmation from the user that the identification of the trailer 16 is accurate and is the correct trailer for which to complete an automated hitching operation, as described further below. After the trailer 16 is identified, controller 26 may then identify the coupler 14 of that trailer 16 within the image data based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data and at least attempt to estimate the position 28 of coupler 14 relative to hitch ball 34 using the image data in accordance with one of the examples discussed above to determine a distance $D_c$ to coupler 14 and an angle ct, of offset between coupler 14 and the longitudinal axis of vehicle 12. Image processing routine 64 can also be configured to identify the trailer 16 overall and can use the image data of trailer 16, alone or in combination with the image data of coupler 14, to determine the orientation or heading of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction. In various examples, such as when the length L of trailer 16 is known, the angular range may be greater, when permitted, or may be less, depending on the desired tolerance of system 10.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius p for vehicle 12 according to the equation:

$$\rho = \frac{1}{W \tan\delta}, \qquad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan\delta_{max}}. \qquad (2)$$

Path derivation routine 66 can be programmed to derive vehicle path 32 to align a known location of the vehicle hitch ball 34 with the estimated position 28 of coupler 14 that takes into account the determined minimum turning radius prim, to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction toward vehicle 12 by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include multiple portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $α_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from portable device or smartphone 96, can be fine-tuned once the image processing routine 64 can identify coupler 14 in the image data, with continued updates for path 32 being similarly derived as the image data becomes increasingly clear during the approach toward trailer 16. It is further noted that, until such a determination can be made, the dead reckoning device 24 can be used to track the location of vehicle 12 in its movement along path 32 toward the initially-derived endpoint 35.

As can be appreciated, the complete process of utilizing system 10 to align the hitch ball 34 of vehicle 12 with the coupler 14 of trailer 16, involves both regular driving of vehicle under the control of the driver in addition to the above-described backing of vehicle 12 under control of system 10. In particular, the driver will most often initially maneuver the vehicle 12 into a position where trailer 16 is in a position such that system 10 can identify the trailer 16 or coupler 14, as discussed above. In the event that vehicle 12 is started in a position relative to trailer 16 such that the identification is immediately possible, the vehicle will still be started in a condition for driving by the user. Accordingly, there system 10 may implement a process to acquire control of vehicle 12, including the steering of vehicle 12 for the automated backing toward trailer 16. In this respect, system 10 can operate to indicate readiness to control vehicle 12 to the user and/or that control of the steering system 20, in particular, has been acquired. One example of such a process is discussed in co-pending, commonly-assigned U.S. patent application Ser. No. 16/269,974 ("the '974 application"), the entire disclosure of which is incorporated herein by reference. Further, system 10 is configured overcome various other limitations of system 10 to provide such indication at a time that is aligned with user expectations, which can improve user experience and reduce instances of user interference with system 10 operation.

Figure 4:
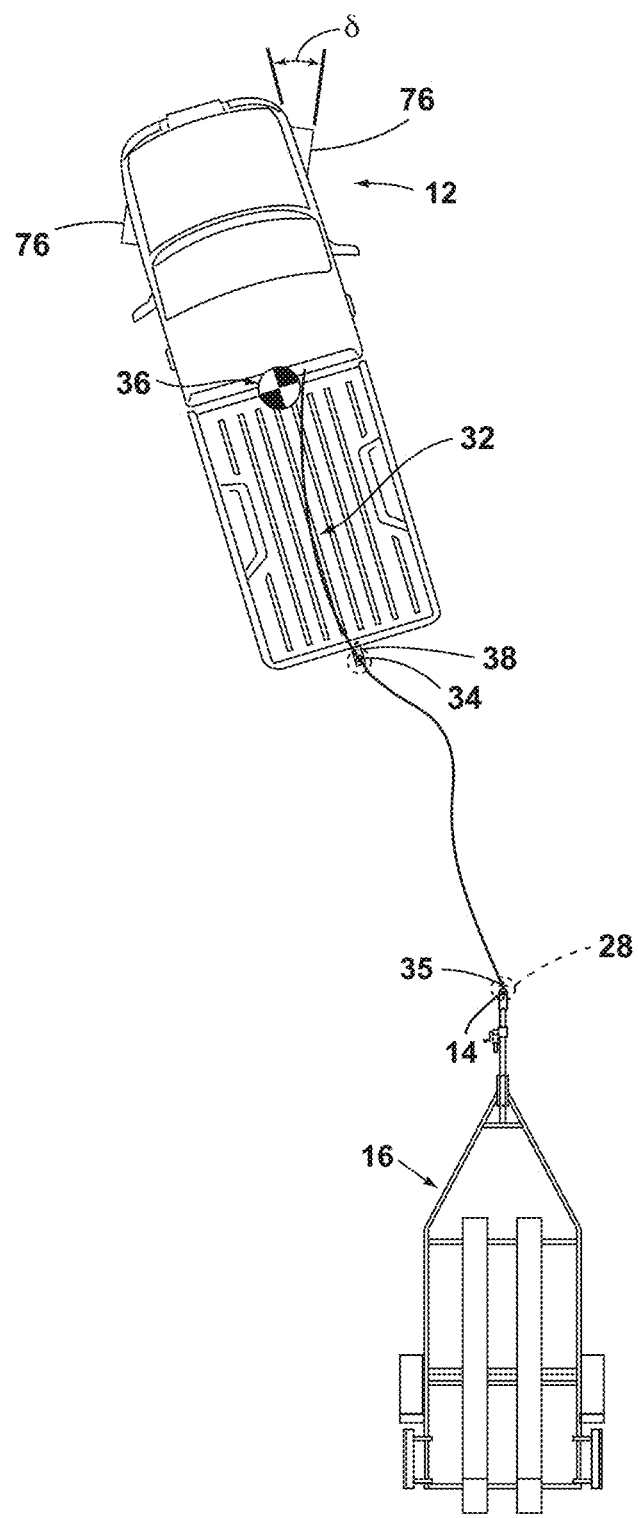
FIG. 4 is an overhead schematic view of the vehicle during a subsequent step of the alignment sequence with the trailer.
Figure 5:
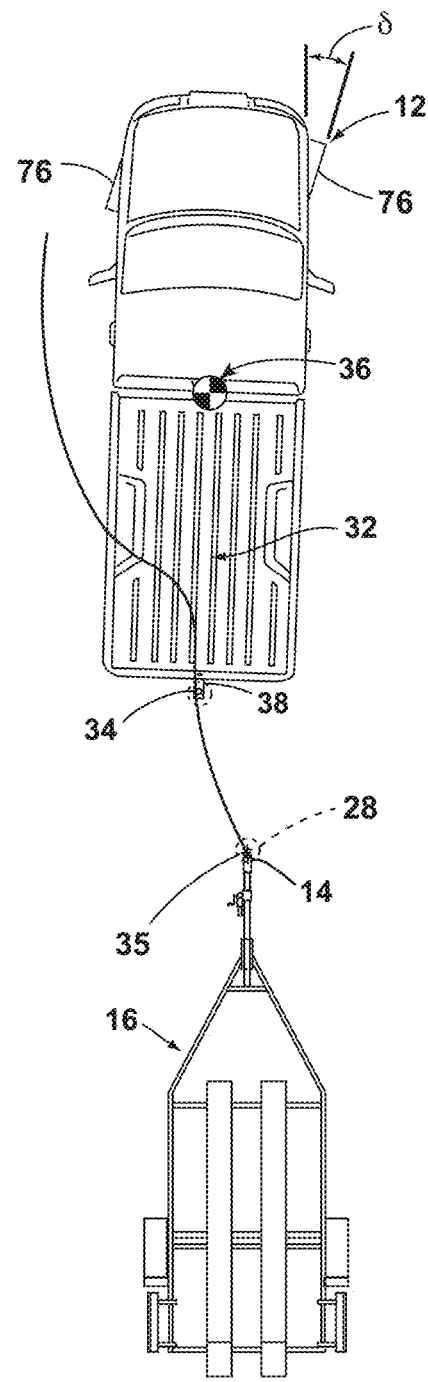
FIG. 5 is an overhead schematic view of the vehicle during a subsequent step of the alignment sequence with the trailer.

With additional reference to FIGS. 4-7, once user gives the maneuver command, the operating routine 68 may guide vehicle 12 using hitching maneuver until hitch ball 34 is positioned relative to coupler 14 for coupler 14 to engage with hitch ball 34 when coupler 14 is lowered into horizontal alignment therewith. In the example discussed above, image processing routine 64 continuously monitors the positioning $D_c$,$α_c$ of coupler 14, constantly or once available, during execution of operating routine 68, including as coupler 14 comes into clearer view of rear camera 48 with continued movement of vehicle 12 along path 32, as shown in FIGS. 4 and 5. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $α_c$ information due to closer resolution or additional image data), including as vehicle moves closer to trailer 16. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $δ_{max}$, while tracking the position $D_c$, $α_c$ of coupler 14 to converge the known relative position of hitch ball 34 to the desired final position thereof relative to the tracked position 28 of coupler 14, as discussed above.

Figure 6:
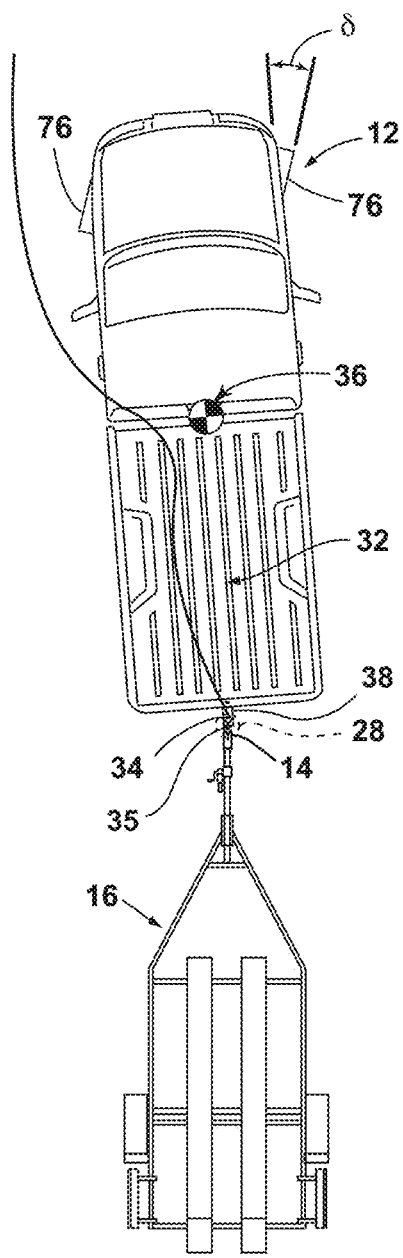
FIG. 6 is an overhead schematic view of the vehicle during a subsequent step of the alignment sequence with the trailer.
Figure 7:
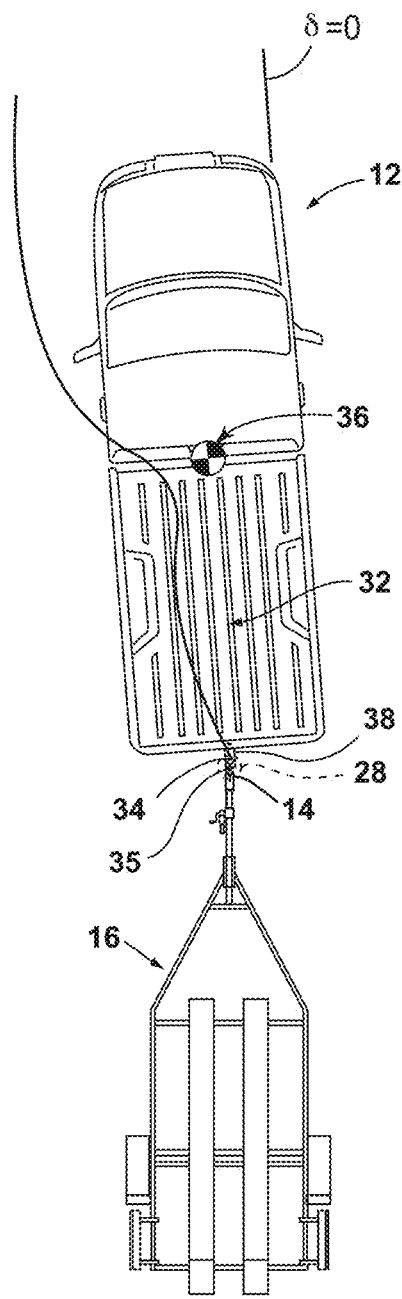
FIG. 7 is an overhead schematic view of the vehicle during a subsequent step of the alignment sequence with the trailer and showing the position of a hitch ball of the vehicle at an end of a derived alignment path.
Figure 10:
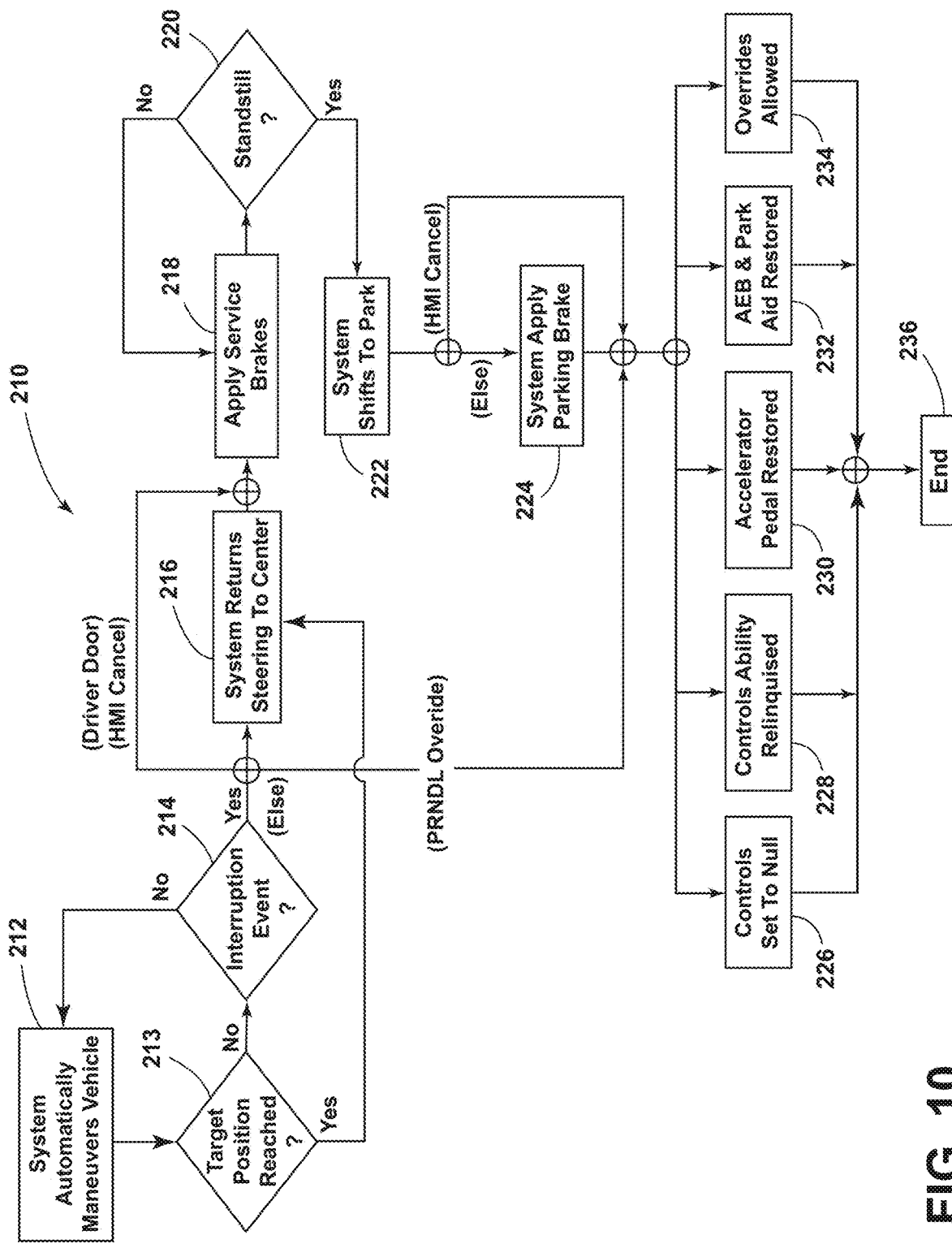
FIG. 10 is a flowchart depicting steps in the alignment sequence, including for the vehicle relinquishing control of a vehicle steering system to a driver in response to various interruption events.

After system 10 causes vehicle to reach and stop at the position shown in FIG. 6, in which the hitch ball 34 of vehicle 12 is aligned with the coupler 14 of trailer 16, system 10 can end the automated hitching maneuver and execute a process according to the present disclosure, illustrated in FIG. 10, to give control of vehicle 12 and, in particular, steering system 20, to the driver. In this respect, system 10 automatically backs the vehicle 12 toward the trailer 16 (step 212) until the endpoint 35 of path 32 is reached (step 213). When the endpoint 35 is reached, the maneuver is considered complete and system 10 can move the steered wheels 76, if necessary, to a centered position (i.e. a zero degree turn position, or a steering angle δ having a zero value), as depicted in FIG. 7 (step 216). System 10 may also shift the vehicle to park (step 222) and cause activation of the parking brake 98 (step 224) when the desired position is reached and vehicle 12 is stopped (i.e. in steps 218 and 220) so that vehicle 12 does not move from the aligned position when the vehicle service brakes 71 are released. According to the present disclosure, this and other similar actions taken to maintain the position of vehicle 12 are considered a part of the step of completing the automated hitching maneuver.

Figure 8:
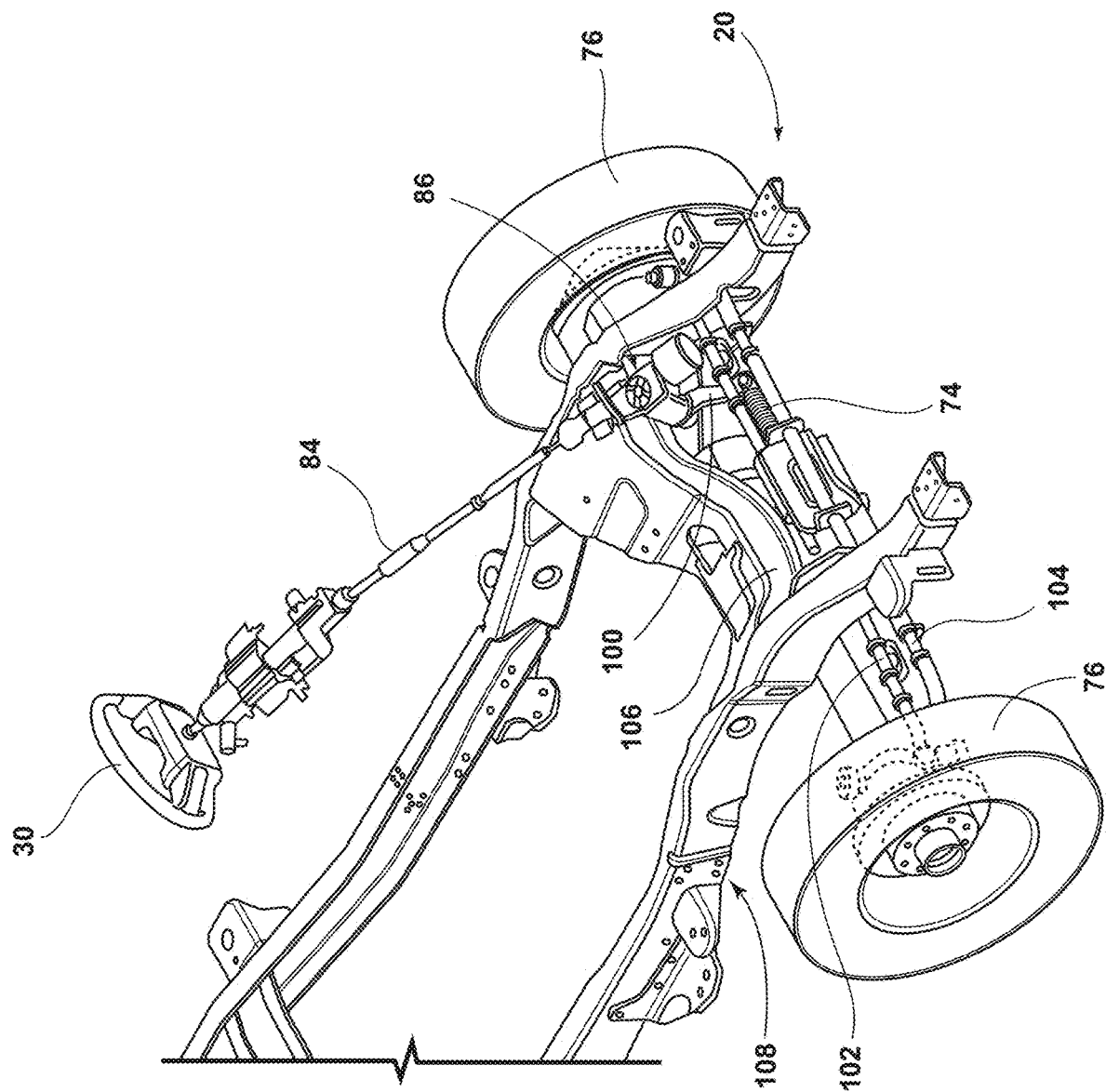
FIG. 8 is perspective view of an example vehicle steering system.

In one aspect, the system 10, as described herein includes an implementation of the steering system 20 with the steered vehicle wheels 76 mounted on the exterior of the vehicle 12, as shown in FIG. 1. As discussed above, the steering motor 74 of the steering system 20 is mechanically coupled with the steered vehicle wheels 76. As shown in FIG. 8, the steering system 20 further includes the steering wheel 30, which is mounted in the interior of the vehicle 12 and is mechanically coupled with the steered vehicle wheels 76. In particular, steering wheel 30 can be indirectly coupled to steering column 84 such that rotation of the steering wheel 30 causes rotation of the steering column 84 (and vice-versa). The steering column 84 may be coupled oppositely from steering wheel 30 to a recirculating ball nut mechanism 86 at an input thereof.

The recirculating ball nut mechanism 86 may be of a general or appropriate construction and may include an output or link member 100 that rotates between at least a first position in which the steered wheels 76 are turned all the way to the left (i.e. at the maximum steering angle $\delta_{max}$) and a second position in which the steered wheels 76 are turned all the way to the right (also at the maximum steering angle $\delta_{max}$). More particularly, the output member 100 of the mechanism 86 may be coupled to a drag link 102. The drag link 102 is oppositely coupled to a steering knuckle of one of the steered wheels 76 (e.g., the right-hand steered wheel 76) such that movement of the output member 100 moves the drag link 102 causing the steering knuckle to rotate the wheel to change the steering angle $\delta$ of that steered wheel 76. The steering knuckle of the right-hand steered wheel 76 may also be coupled to a tie rod 104. The tie rod 104 may be oppositely coupled to the steering knuckle of the left-hand steered wheel 76 such that movement of the steering knuckle of the right-hand steered wheel 76 is directly transferred to movement of the left-hand steered wheel 76 by the tie rod 104 to simultaneously change the steering angle $\delta$ of that steered wheel 76. While the present illustrated example is disclosed as including a drag link steering geometry as part of the steering system 20, it should be understood that the illustrated example may also include a Haltenberger or a parallel link steering system or any other steering system that may be usable or appropriate in a vehicle according to the depicted example.

The steering system 20 further includes the above-mentioned steering motor 74. The output of the steering motor 74 may be provided as an input to the drag link 102 at the same point of connection with the output member 100 of ball nut mechanism 86 for assisting in rotating the steered wheels 76. The steering motor 74 may be oppositely coupled to and supported on a crossbeam support or cross member 106 that may extend between the left-hand and right-hand beams of the vehicle frame 108 to transfer the forces generated by the steering motor 74 to the drag link 102 using the vehicle frame 108 as a base. The steering motor 74 may be supplied with electrical power from the electrical system of the vehicle. The 74 is configured with an internal electrical motor that generates a rotary output to drive linear movement of the output thereof (i.e. the portion coupled to drag link 102). Additional aspects and further examples of an EPAS steering system 20 useable in connection with the system 10 described herein are found in commonly-assigned U.S. Pat. No. 8,893,846, the entire disclosure of which is hereby incorporated by reference herein.

The steering motor 74 of the illustrated example may be controlled as desired or necessary to provide steering assist during operation of the vehicle. As discussed above, a controller can be connected with the steering motor 74 to supply a variable current or to otherwise vary the output of the steering motor 74 to provide the desired steering assistance characteristic for system 20, including assistance meeting expectations for a typical power-assisted steering system during normal driving of the subject vehicle 12. As also discussed above, the present controller 26 that is used to implement the hitch assistance functionality described herein 26 may be the controller 26 associated with and used to control EPAS steering system 20, including during driving without the use of operating routine 68, for example. More particularly, the hitch assistance functionality described herein can be included within the functionality of the steering system 20 such that the controller 26 executing operating routine 68 and the like is the controller of the steering system 20. During normal driving, the controller 26 can use input from torque sensor 80 in a closed-loop manner, for example, to allow user inputs on steering wheel 30 to control the output of steering motor 74 to provide the desired power assistance to the steering provided by the user (with additional inputs taken in various examples, from steering angle sensor 78, vehicle speed sensor 56, and the like).

System 10 can operate by having controller 26 take full control of the steering system 20 through established communication with steering motor 74 in the above-described steering angle control mode. In particular, controller 26 can, by way of its connection with steering motor 74, operate steering motor 74 to command a desired steering angle $\delta$, as called for by operating routine 68 (for example, without seeking input from torque sensor 80) and measured by steering angle sensor 78. In a further example, controller 26 can actually use an input from torque sensor 80 as a fault signal in operating routine 68 that, under certain conditions, can result in operating routine 68 terminating to abort the hitch assistance maneuver.

The action of the system in moving 230 the steered wheels can be beneficial to the driver in subsequent control in driving vehicle 12. In particular, when the system 10 completes or aborts the automated hitching maneuver 224, the steered wheels 76 are left at the angle $\delta$ last commanded by the system 10. This angle $\delta$ may be close to the maximum steering angle $\delta_{max}$ to either the left or right, which may not be apparent to the driver, as the steering wheel 30, while remaining coupled with the steered wheels 76, does not directly align with the steered wheels 76 through the respective ranges of motion. Because the driver does not actually turn the wheel during the automated hitching maneuver 224, the driver may be potentially unaware of the actual steering angle $\delta$, which may be inconvenient when the driver begins driving. For example, if a trailer is hitched and the driver begins driving the vehicle 12 in reverse, a trailer jackknife condition may result. If the vehicle 12 is driven in the forward direction, the trailer 16 may collide with a neighboring object, due to the geometry of pulling a trailer 16 out of its parked position while turning. Other examples of adverse vehicle 12 maneuvering at an unknown high steering angle $\delta$ may be further apparent. Further, a handoff by system 10 of the vehicle 12 in such a state may not meet driver expectations and may be frustrating. In this respect, it may be generally desired that, after various executions of the automated hitching maneuver 224 are completed, system 10 consistently leaves the vehicle 12 the same state. If the vehicle 12 is repeatedly left in the same state when control is released by the system 10, the driver can easily understand and expect this behavior by the system 10, potentially leading to less driver confusion.

In this manner, the handoff process of FIG. 10 includes movement of the steered wheels 76 to the centered position (step 216), which is carried out by system 10 in a similar manner to movement of the steered wheels 76 during the automated hitch maneuver. In particular, controller 26 sends a zero-degree steering angle command δ to steering system 20, operating in the above-described steering angle control mode, whereby the steering system 20 uses steering motor 74 to move the steered wheels 76, as discussed above with respect to FIG. 7, to the desired position. Because the steering wheel 30 remains coupled with the steered wheels 76, the movement of the steered wheels 76 to the centered position also causes the steering wheel 30 to move to a centered position. In at least one aspect, such movement signals to the driver that the steered wheels 76 are moving to the centered position.

After the steered wheels 76 move to the centered, zero-degree turn position, the controller relinquishes control of the steered wheels 76 (for example, by having controller 26 end operating routine 68 and changing operation of steering system 20 to a torque-based, normal operating mode) (step 228). The step of moving the steered wheels 76 to the centered position, however, may take an appreciable amount of time, depending on the final steering angle δ commanded by operating routine 68. Still further, certain conditions may interrupt the centering operation such that the centering operation may be canceled before completion. In such aspects, user indication and timeout processes can be incorporated into the centering operation, as discussed in the above referenced '974 application.

Continuing with respect to FIG. 10, during the above-described maneuvering of vehicle 12 under the control of controller 26 executing operating routine 68, certain events may occur that can lead to an interruption of the movement of vehicle 12 or in the control of vehicle 12 by controller 26. In one example, an interruption event may arise from a fault or operational interruption, within system 10, including within a loss of network communication within system 10 such that the information from one or more of the sensors, cameras, or positioning devices becomes unavailable to controller 26, or an interruption to the operation of one of such system 10 components. In another example, the driver may override system 10 control of vehicle 12 by interaction with the steering wheel, the accelerator pedal, the gear selector 94, or the brake pedal. Still further, vehicle 12 may encounter a feature (for example, a bump, rock, or other object, or a soft or slippery surface condition that causes wheel slip) that vehicle 12 may be able to overcome by driver operation, but that system 10 may not be able to cause vehicle 12 to overcome based on a control limitation imposed on the system 10, as discussed further in co-pending, commonly-assigned U.S. patent application Ser. No. 16/459,960 ("the '960 application"). Other interruption events may include a loss of input data (e.g., by system 10 losing track of coupler 14, including by a change in condition, a visual obstruction, or by coupler 14 moving out of the field of view of imaging system 18), one of the vehicle doors 114 being opened, or other driver-initiated interruptions, including a driver-selected pause or cancel of operating routine 68 by interaction with HMI 40 or the like), or a feature override (e.g. a driver activation of another automated or semi-autonomous vehicle function that conflicts with execution of operating routine 68, such as a parking assistance feature or the like).

Figure 9B:
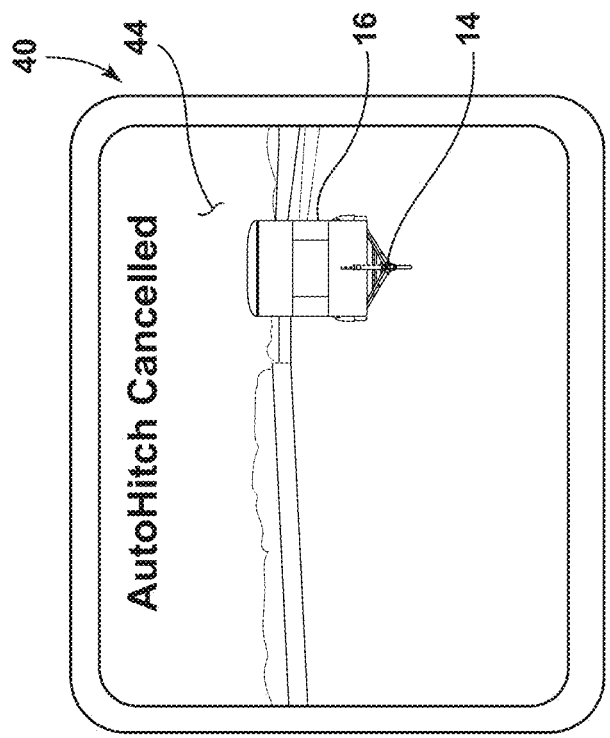
FIG. 9B is an image of a vehicle human-machine interface after the control event of FIG. 9A.
Figure 9A:
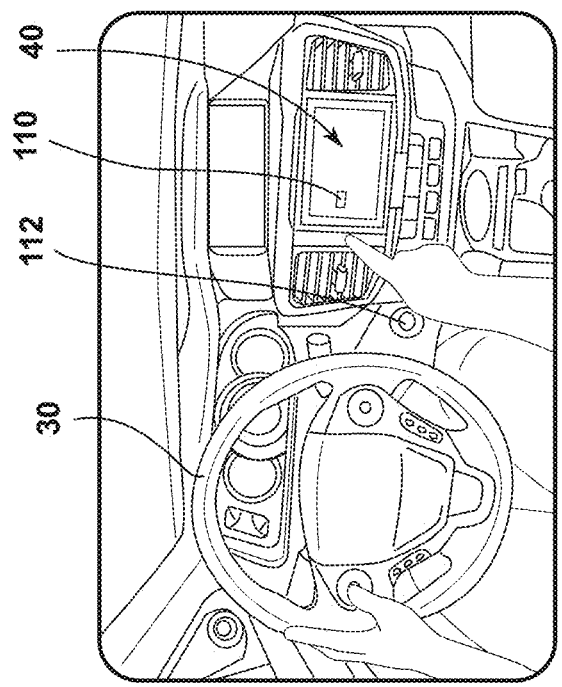
FIG. 9A is an image of an interior of a vehicle during a control event by a driver.

Because of the range of potential interruption events that may occur, system 10 may be further configured to respond appropriately to the different situations that may result in interruption. In one aspect, the control logic within system 10 memory 62, including within operation routine 68, can be made to either retain vehicle 12 control by the system 10, or return full control of vehicle 12 to the driver. Even further, if the control logic dictates that control of vehicle 12 be returned to the user, additional determinations may be made regarding the particular handover process, including the state of vehicle 12 (which may include whether to shift the vehicle to park and/or whether the steering should be centered or not). In this respect, for certain interruption events (referred to herein as standard interruption events), system 10 completes a handover sequence similar to that which is used at the end of an automated hitching maneuver. Such a sequence, again, includes bringing the vehicle 12 to a stop, shifting the vehicle 12 transmission 92 to park, applying the electronic parking brake 98, returning the steering system 20 to the centered position, returning the throttle 73 controls to the driver (or at least relinquishing the control of throttle 73 form system 10), making other external features available to the driver, and releasing any other vehicle 12 controls (e.g. service brakes 71 and the like). System 10 is further configured to implement a different handover process for certain interruption events (referred to herein collectively as exception interruption events) that are interpreted as requests from the driver to take immediate control of vehicle 12 or situations where immediate driver control may be desired. Various examples of exception interruption events are depicted in FIG. 9A. In one such example, the vehicle HMI 40 may, during execution of operating routine 68, offer the driver an option to manually cancel the routine 68, thereby ending the automated hitching process with the purpose of returning vehicle 12 control to the driver. In this respect, HMI 40 may present on touch-screen 42 a soft button or other menu option 110 to cancel the automated hitching maneuver. As shown in FIG. 9B, when the cancel option 110 is selected, system 10 treats the event as an exception interruption event and brings vehicle 12 to a stop before returning the control of vehicle 12 (including control of the powertrain control system 72, the brake system 70, and the steering system 20) to the user before vehicle 12 reaches the endpoint 35 of path 32 (i.e. with vehicle 12 positioned away from the subject trailer 16). In such a situation, it may be assumed that the driver, in canceling the automated hitching maneuver, wishes to take immediate control of the vehicle 12 to begin driving and may be appropriately aware of the position of steering wheel 30 to the extent that applying the parking brake 98 and centering the steered wheels 76 is unnecessary or undesirable. Other similar situations may also take advantage of the same or a similar altered handover process, examples of which may include, the driver opening the driver's side door 114 of vehicle 12, manually operating the gear selector 94, and the like.

An example of logic 210 for system 10 in implementing a situationally-variable handover process is illustrated in FIG. 10. As can be seen, when system 10 is executing operating routine 68, as discussed above, the system 10 automatically maneuvers the vehicle 12 (step 212) towards the coupler position 28 (i.e. to an appropriate vehicle 12 position for alignment of hitch ball 34 with coupler 14). During such maneuvering (step 212) system 10 simultaneously controls the steering system 20, powertrain control system 72, and brake system 70, as needed for the desired vehicle 12 alignment with trailer 16. As discussed above during vehicle 12 maneuvering under control of system 10 (step 212), and prior to vehicle 12 reaching the endpoint 35 of path 32 (step 213), a number of events can occur (step 214) that can directly interrupt operation of system 10 or can signal to system 10 that automated maneuvering should be interrupted. System 10 can be configured to default to the above-described handover process absent a specified interruption event, which may include the driver door 114 being opened (which may be communicated to controller 26 via door sensor 116 that is mechanically actuated by door 114 and electrically connected with controller 26), a user initiated cancelation (via HMI 40), or manipulation of the gear selector 94. In this manner, absent such an event in step 214, system 10 controls the electric steering motor 74 to return the steered wheels 76 and, accordingly, the steering wheel 30 to their respective centered positions (step 216). During the default process, system 10 can apply the vehicle service brakes 71 (step 218) to bring vehicle 12 to a stop (step 220). Once vehicle 12 is stopped (step 220), system 10 shifts the transmission 92 to Park (step 222) and applies the parking brake 98 (step 224).

For the above-mentioned specified exception interruption events, the handover sequence is modified to meet driver expectations based on the assumed desire of the driver to assume control of vehicle based on such events. As discussed above, the depicted logic 210 accounts specifically for the driver door 114 being opened, a user initiated cancelation (via HMI 40), or manipulation of the gear selector 94 (with other events being accountable for in a similar way, depending on the user expectations for such events). As shown in FIG. 10, if the interruption event in step 214 is the driver door 114 being opened or a user-selected cancellation of operating routine 68, system 10 does not re-center the steered wheels 76 or steering wheel 30 (by skipping step 216) and proceeds to stop vehicle 12 (step 220) by applying the service brakes 71 (step 218). As discussed above, system 10 continues applying the service brakes 71 (step 218) until the vehicle 12 comes to a complete stop (step 220). Once stopped, system 10 controls gear selector 94 to shift the transmission 92 to Park (step 222) and applies the parking brake 98 (step 224) to secure vehicle 12 at a standstill. In this respect, the handover process when the interruption event (step 214) is the driver door 114 being opened or a user-initiated cancelation is similar to the normal interruption response, except that the steering (steered wheels 76 or steering wheel 30) is not re-centered (i.e., by skipping step 216).

In the instance where the interruption event in step 214 is determined to be user interaction with the gear selector 94 to change the state of transmission 92, the steering re-centering step 216 is similarly skipped. Further, in such an instance, system 10 further does not bring vehicle 12 to a stop (i.e., by also skipping steps 218 and 220) and, accordingly, does not shift the transmission 92 to Park or engage the parking brake 98 (by skipping steps 222 and 224). In this manner, the action by the driver in manipulating the gear selector 94 is interpreted as a request to begin driving vehicle 12, and the system 10 is designed to allow facilitate driver control quickly. It is noted that a driver manipulation of gear selector 94 to take control of vehicle may most commonly be a change in gear selector 94 state from the Reverse mode to Drive mode (or from Neutral to Drive, depending on whether the control of transmission 92 by controller 26 in placing the transmission 92 in reverse to execute operating routine 68 is indicated on the gear selector 94). Accordingly, the change is interpreted, as discussed, as a desire for the driver to assume control of vehicle 12. In this respect, shifting to Park may be disabled at speed or would result in vehicle 12 stopping quickly, negating the need for system 10 to stop vehicle 12 by way of service brakes 71 or to shift to Park.

As further shown in FIG. 10, additional actions are always performed in a handover sequence, regardless of the type of interruption event in step 214. Specifically, system 10 releases all controls of the vehicle 12 (including steering system 20, powertrain system 72, and brake system 70) by setting all control signals for such systems to null (step 226). System 10 also cancels its ability to control certain vehicle 12 control components, including the transmission 92 via gear selector 94 and parking brake 98 (step 228). In one implementation, the ability to control such components results from the vehicle 12 allowing automated controls of its subsystems (e.g., through an on-board computer, other controller, or through functionality of controller 26) such that system 10 canceling the ability to control such components or systems results from system 10 signaling that vehicle 12 should cancel the allowance for system 10 to control such components or systems. In another aspect, system 10 disables the accelerator pedal (or throttle control 73) during the automated reversing maneuver of operating routine 68. Accordingly, throttle control 73 is restored to normal operation in step 230. Other vehicle 12 systems or controls may be disabled during the automated reversing maneuver, including automatic emergency braking system 118 (FIG. 2) ("AEB") and park aid proximity beeping via a rear object detection system 120 (FIG. 2), as these features may be actuated by the trailer 16 during the automated reversing maneuver (and may conflict with system 10 operation and/or user expectations). Accordingly, the handover process includes restoring such features to normal operation in step 232. Similarly, operation of system 10 to execute the automated reversing maneuver of operating routine 68 results in vehicle 12 blocking the initiation of other autonomous or automated driving features, including such as parking assistance functionality, for example, are not allowed to displace the execution of operating routine 68 while the vehicle 12 is in motion under control of system 10. As an additional aspect of the handover sequence 210, such features are allowed by vehicle 12 to replace the operating routine 68, if requested by the driver (e.g., via HMI 40).

Figure 11:
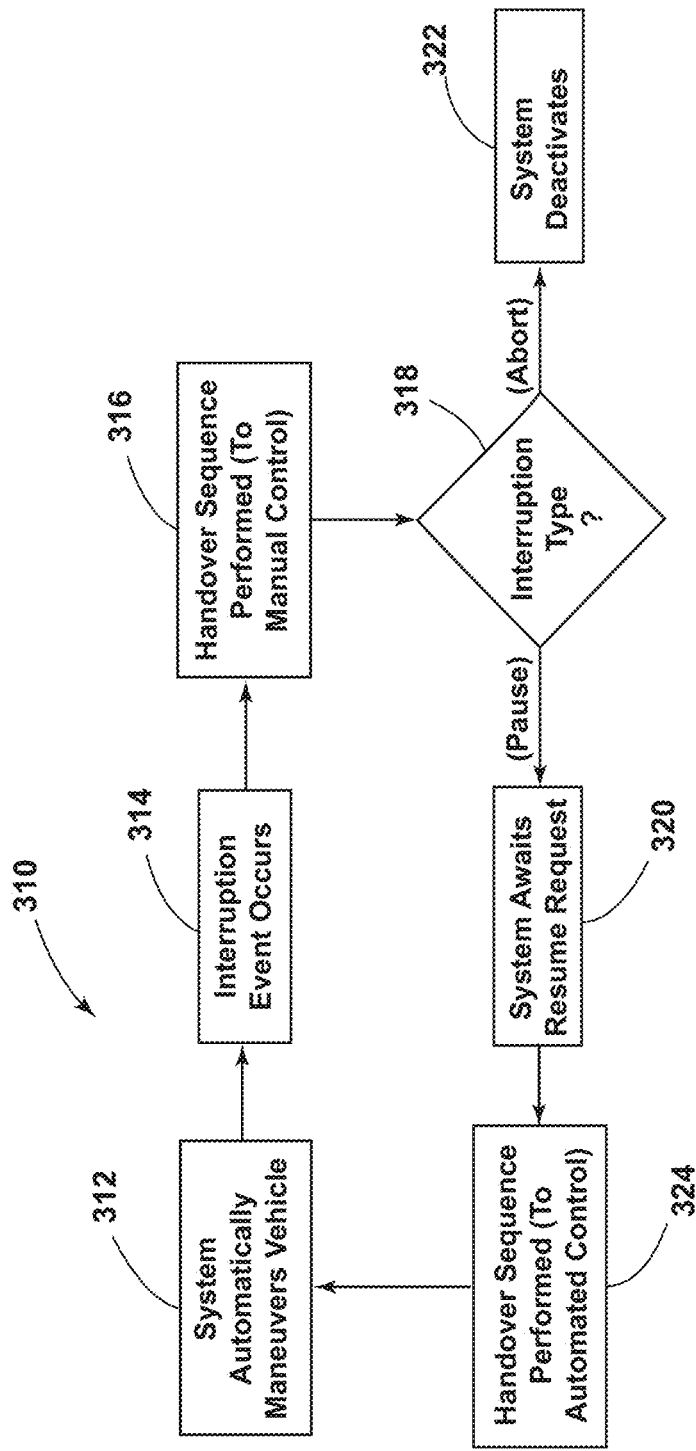
FIG. 11 is a flowchart depicting steps in the alignment sequence, including for the vehicle relinquishing control of a vehicle steering system to a driver and either deactivating or remaining paused, depending on a classification of the interruption event.

In an additional aspect, illustrated in FIG. 11, system 10 may further be configured to classify certain interruption events as "pause" events and other events as "abort" events in an additional sequence 310. Pause events result in system 10 executing the handover process 210, as described above and illustrated in FIG. 10, but allow the driver to command system 10 to resume the automated reversing maneuver by reactivating operating routine 68, if desired. By contrast, abort events result in system 10 shutting down completely and entering a "standby" mode, or a pause state, where system 10 can be reactivated, but operating routine 68 cannot be immediately restarted. As illustrated in FIG. 11, system 10 controls the steering 20, powertrain 72, and brake 70 systems to maneuver the vehicle 12 towards the coupler position 28 for alignment of the hitch ball 34 with the coupler 14 (step 312). When an interruption event occurs in step 314 (which may be as described above in step 214 in the process 210 of FIG. 11), a handover sequence is performed (step 316). The handover sequence may be according to steps 216-234, as applicable depending on the particular interruption event in accordance with the above description and the sequence 210 of FIG. 10. After the handover sequence (step 316) is complete, system 10 will again refer to the type of interruption event, as determined by or communicated to system 10 and will classify the interruption event as either an abort event or a pause event (step 318).

In general, the interruption events that system 10 is configured to account for in the handover process 210 are classified in memory 62 as either a pause event or an abort event, depending on whether the driver is expected to want to resume the automated backing maneuver (i.e. to restart operating routine 68). In one aspect, the above-described interruption event where the driver door 114 is opened may be classified as a pause event, as the drivers may wish to exit vehicle 12 to check the coupler 14 height during an automated hitching maneuver with the desire to resume maneuvering if the coupler 14 is determined to be at, or is adjusted to, an acceptable height. Similarly, a brake override by the driver can also be classified as a pause event, which may allow a driver to temporarily stop vehicle 12 for various reasons, as may a slight steering override (e.g., resulting in steering wheel 30 turning by less than one-half or one-quarter revolution and/or for less than a predetermined time of about two seconds or less), which can prevent accidental interferes with the steering wheel 30 from causing a system 10 exit (as system 10 may be able to continue after such an interruption). Still further a gear selector 94 override may be classified as a pause event, as the driver may wish (or be directed by system 10) to pull vehicle 12 forward to reposition with respect to trailer 16 and then resume the automated backing maneuver. If these or any other pause events occur, system 10 maintains an active state and waits (step 320) for the driver to indicate that system 10 resume executing operating routine 68. In this respect, system 10 may, when paused, continue tracking the position 28 of coupler 14 in image data 55 so that operating routine 68 can easily be resumed by a user-initiated resume request, and any path data can remain stored in memory 62. Additionally, some of the handover steps discussed above in FIG. 11, including relinquishing of vehicle 12 controls (step 228) and allowing override from other control features (step 234), as doing so may prevent intervening interruption of system 10 or delay restart of operating routine 68.

As discussed above additional interruption events may be classified as abort events due to an assumption that the driver is likely to not wish to resume the automated backing maneuver or due to a determination that resuming the automated backing maneuver is not possible under the circumstances. In this respect, a fault within system 10, including within imaging system 18, one or more of the vehicle sensors or systems (or the ability of controller 26 to communicate with such sensors or systems) may interrupt system 10 and prevent system 10 from resuming operating routine 68 and may, accordingly, be considered an abort event. Similarly, a user-initiated cancellation of operating routine 68 via HMI 40 can indicate that the driver does not wish to resume operating routine 68 and may be considered an abort event. In at least some respects, certain control limitations (including terrain induced or related limitations, such as unsurmountable bump or loss of traction) may result in the vehicle 12 reaching an unintended standstill condition considered an abort condition. In other instances, system 10 may consider such standstill condition events as a pause event and can give the driver the opportunity to remedy such events or may first determine if a nudge or other function can be executed to resume movement (if, for example, an adequate distance dc remains between hitch ball 34 and coupler 14), as discussed in the above-mentioned the '960 application. As shown in FIG. 11, if an abort event occurs, the system 10 shuts down and enters a standby (step 322) or deactivated state, including by executing all of the additional steps (226-234).

Continuing with respect to FIG. 11, when the system 10 is paused (step 320), the system 10, upon receiving a resume request from driver, can execute a control acquisition process (step 324) where control of vehicle 12 is reacquired, with appropriate indication given to the driver. Once vehicle 12 control is regained, system 10 can resume automated maneuvering of vehicle 12 (step 312) to back vehicle 12 such that hitch ball 34 is aligned with coupler 14. This may include re-executing the path derivation routine 66 in the event that a change in coupler 14 position 28 has resulted from movement of vehicle 12 during the pause state.

Figure 12:
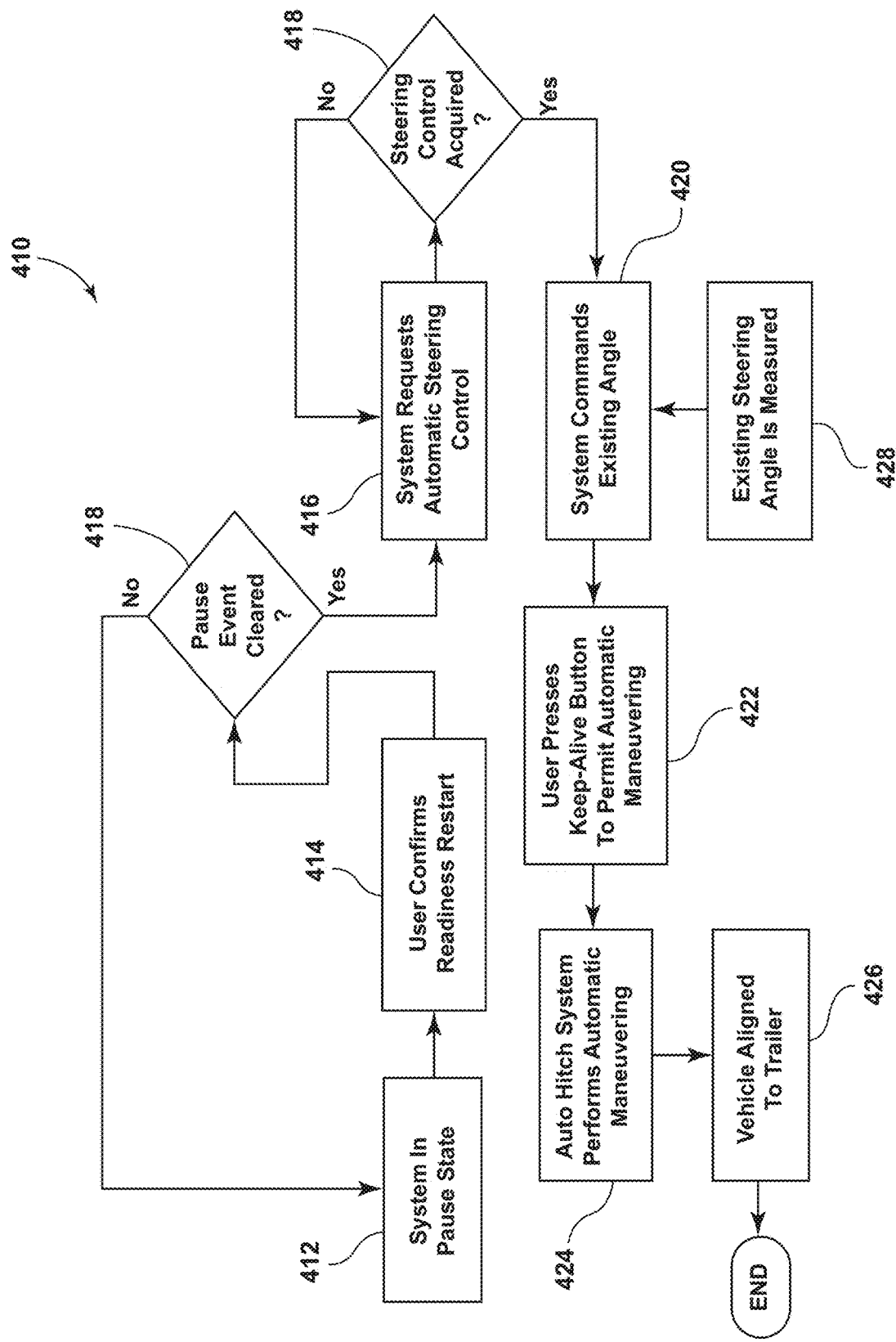
FIG. 12 is a flowchart depicting steps in the alignment sequence, including for the vehicle re-acquiring control of a vehicle steering system after a pause event.

An example of a process that system 10 can use to re-acquired vehicle control is shown in FIG. 12, which further illustrates one potential process to indicate vehicle control to the driver. As shown, the illustrated process 410 begins with system 10 in the above-described pause state (step 412) after encountering an interruption event during execution of operating routine 68, with the event being classified as a pause event. When in the pause state, system 10 can restart the hitching operation upon an indication by user (step 414), such as by selection of an appropriate menu item via HMI 40 or by activation of a soft button presented on HMI 40 (which may be done automatically when vehicle 12 is in reverse and/or when a trailer 16 is identified by imaging system 18) or a physical button on the vehicle 12 instrument panel. As discussed above, system 10 can continue executing the above-described image processing routine 64 in communication with imaging system 18 such that trailer 16 and/or coupler 14 remain tracked within the field of view of one or more cameras 50 (or a particular area within the field of view). As long as the trailer 16 and/or coupler 14 remain identified, system 10 can indicate the identification (by way of HMI 40, for example) and the readiness of system 10 to navigate vehicle 12 toward trailer 16. Additionally, it is noted that the initial pause event must first be cleared or otherwise addressed (step 215), such as by appropriate vehicle 12 repositioning, the driver discontinuing interference with steering wheel 30 or closing the driver door 114, or the like.

In the present example, system 10 can be configured to initiate the process of controlling vehicle 12 to navigate toward trailer 16 upon the driver shifting 214 the vehicle 12 transmission 92 into neutral, which is interpreted by system 10 as an indication of the driver's readiness to begin the automated hitching process. At this point, system 10 can run the path derivation routine 66, which can, among other things, produce an initial steering angle δ that will be commanded by system 10 when operating routine 68 begins. System 10, however, will wait at this point to actually restart operating routine 68 until a specific command is received from the user, as discussed below. According to the present disclosure, system 10 may prepare for such a command, and the corresponding execution of operating routine 68, prior to such a command by acquiring control of steering system 20 when the user readiness indication (step 414) is received and indicating to the user that such control has been acquired.

As shown, acquisition of control of steering system 20 by controller 26 can be facilitated by steering system 20 having an operating mode wherein the steering motor 74 operates in an steering angle control mode, wherein the steering system 20 receives a particular steering angle δ as an input, rather than, for example, a steering wheel 30 torque (discussed further below). In this respect, controller 26 can acquire control of steering system 20 by requesting (step 416) that steering system 20 operate in the steering angle control mode and that it receives the steering angle δ input from controller 26 as an output of operating routine 68, when running. In this respect, there may be one or more preconditions required for system 10 to gain control of steering system 20 in this manner. System 10 evaluates (step 418) these preconditions and, if they are not met, the system 10 continue requesting control (step 416) until the preconditions are met or the operation is canceled. In various examples, for controller 26 to be given control of steering system 20, the vehicle speed must be below a threshold, the torque applied to the steering wheel 30 must be below a threshold. Additionally, there may be a time-based precondition such that, after control is requested (step 416), a current steering wheel 30 angle must be held for a certain amount of time to ensure proper engagement of the steering motor 74.

When the required preconditions are met, controller 26 is given control of steering system by way a connection (direct or indirect) with steering motor 74. As discussed, in the present example, this is done by allowing the controller to output the steering angle δ of operating routine 68 as an input to steering system 20 in the steering angle control mode. Again, as the operating routine 68 is not yet running, no steering angle δ is output by operating routine 68 so, under such conditions, system 10 would not respond to control being allowed in a perceivable manner. Accordingly, system 10 can, upon such control being granted, send output command (step 420) as an indication that steering control has been acquired (and, thus, that system 10 is ready to automatically execute the hitching maneuver) before operating routine 68 is actually activated. In one example, system 10 can output a message or other visual indication of the acquisition via HMI 40. In another example, system 10 can leverage the available control of steering system 20 in a preemptive manner to give a tactile indication, perceivable to the driver, of the control acquisition. In a still further example, such visual and tactile indications can be given simultaneously. After acquiring control of the steered vehicle wheels 76 and providing output command (step 420) the desired indication thereof, the controller 26 waits to receive a command (step 422) to execute the automated hitching maneuver. In one aspect, the command may be given by the user pressing an additional soft button on HMI 40 or by pressing an additional physical button 112 (FIG. 9A) on the instrument panel or the same button used to start the hitching operation initially. In one aspect, the button 112 may be a "keep alive" button such that the user must continue to depress the button 112 for system 10 to start and maintain the operating routine 68. Should the user stop depressing such a button 112, the operating routine 68 can either be paused again or aborted entirely (depending on system 10 configuration). In either example, upon receiving the output command (step 420), system 10 allows controller 26 to control the steered vehicle wheels 76 using the steering motor 74 to perform the automated hitching maneuver (step 424) (which may further include control of the vehicle brake control system 70 and/or the powertrain control system 72) until the desired alignment with coupler 14 is achieved (step 426).

To provide above-mentioned tactile indication of steering system 20 control, controller 26 can cause some degree of movement of steering wheel 30. In one application, the structure of steering system 20 and its integration into vehicle 12 can facilitate such movement in an effective manner. By the connection between steering wheel 30 and controller 26 by way of steering motor 74 in the example discussed above with respect to FIG. 8, or other similar examples, the controller 26 may cause the steering motor 74 to move the steering wheel 30 to indicate control of the steered wheels 76, as discussed above. In particular, the controller can cause the steering motor 74 to move the steering wheel 30 in a low-amplitude oscillation to indicate that controller 26 has acquired control of the steered vehicle wheel 76. In one example, this movement may be achieved by controller 26 determining an initial steering angle δ of the steered wheels 76 (i.e. an "initial steered vehicle wheel angle") from the steering angle sensor 78 (step 428) and sending that steering angle δ as a control input for steering motor 74, which is operating in the steering angle control mode (step 420). Because the controller 26 is commanding the same steering angle that is already in place, the position of the steered wheels 76 will not effectively change and vehicle 12 will not change position. By sending an active steering angle command input, however, system 10 will cause the steering motor 74 to engage, which will cause a small but noticeable tactile indication to the user by moving the steering wheel 30. This movement may be characterized as a flutter, vibration, stiffening, twitch, or jerk of the steering wheel 30, thus informing the driver the system 10 has acquired control of the steering system 20.

As discussed above, the described tactile indication of steering system 20 control by system 10 communicates to the user that the system 10 is ready to begin the automated hitching maneuver. In this manner, by the time the user provides the command to begin the maneuver (step 422), the system 10 can responds quickly in beginning to control the steering angle δ to follow the planned path 32, at least in part because steering motor 74 is already engaged. This engagement results in little to no delay in system 10 commanding the desired steering angle δ, per operating routine 68, and the corresponding movement of vehicle 12, upon the user providing the command (step 422).

It is noted that, as discussed above, the various methods 210, 310, 410 can be combined or otherwise adapted to be used together in various implementations of system 10 or can be used alone in further implementations of system 10, as described herein.

It is also to be understood that variations and modifications can be made on the aforementioned structure without departing from the concepts of the present invention, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A hitching assistance system for a vehicle, comprising:
a steering system including a vehicle steering wheel; and
a controller executing an automated hitching maneuver including:
controlling the steering system to back the vehicle toward a trailer;
monitoring the hitching assistance system for an interruption event affecting execution of the automated hitching maneuver;
detecting the interruption event and identifying the interruption event as one of a standard interruption event or an exception interruption event;
upon identifying the standard interruption event, causing the steering wheel to move to a centered position and ceasing control of the steering system; and
upon identifying the exception interruption event, ceasing control of the steering system without causing the steering wheel to move to the centered position.

2. The system of claim 1, wherein the controller further:
upon detecting the exception interruption event, maintains an active state while waiting for a user-initiated resume request; and
upon detecting the standard interruption event, enters a deactivated state including terminating the automated hitching maneuver.

3. The system of claim 2, wherein, when receiving the user-initiated resume request the controller reacquires control of the steering system.

4. The system of claim 2, further including a door sensor and a powertrain control system including an accelerator and a gear selector configuring the powertrain control system among park, neutral, drive, and reverse modes, wherein:
the controller classifies the interruption event as the exception interruption event based on any of:
user interference with the steering wheel;
user change in a configuration of the gear selector; or
the door sensor indicating at least one of a plurality of vehicle doors being opened.

5. The system of claim 2, wherein:
the controller identifies the interruption event as the standard interruption event based on any of:
user cancelation of the automated hitching maneuver; or
the controller identifying a fault within the hitching assistance system.

6. The system of claim 1, further including a system fault sensor and a vehicle speed sensor, wherein:
the controller identifies the standard interruption event based on one of:
the vehicle speed sensor indicating a vehicle standstill condition prior to completion of the automated hitching maneuver; or
the system fault sensor identifying a system fault.

7. The system of claim 1, wherein:
while executing the automated hitching maneuver, the controller further causes disablement of a vehicle emergency braking system and a rear object detection system; and
upon identifying either of the standard interruption event or the exception interruption event, the controller allows for reactivation of the vehicle emergency braking system and the rear object detection system.

8. The system of claim 1, wherein:
the steering system further includes:
steered vehicle wheels mounted on an exterior of the vehicle; and
a steering motor mechanically coupled with the steered vehicle wheels; and
the controller:
controls the steering system while executing the automated hitching maneuver by controlling the steering motor; and
causes the steering wheel to move to the centered position by controlling the steering motor to move the steered wheels to zero-degree steering angle position.

9. The system of claim 1, further including an imaging system outputting image data, wherein:
executing the automated hitching maneuver including controlling the steering system is carried out to move the vehicle into an aligned position, where a hitch ball mounted on the vehicle is aligned with a coupler of the trailer, including tracking a position of the coupler relative to the hitch ball in the image data.

10. A hitching assistance system for a vehicle, comprising:
a steering system including:
steered vehicle wheels mounted on an exterior of the vehicle;
a steering motor mechanically coupled with the steered vehicle wheels; and
a vehicle steering wheel coupled with at least one of the steering motor and the steered vehicle wheels; and
a controller executing an automated hitching maneuver including:
controlling the steering system to back the vehicle toward a trailer;
monitoring the hitching assistance system for an interruption requiring the automated hitching maneuver to be terminated; and
upon identifying the interruption event requiring the automated hitching maneuver to be terminated, causing the steering wheel to move to a centered position by controlling the steering motor and ceasing control of the steering system.

11. The system of claim 10, wherein the controller,
upon identifying the interruption event requiring the automated hitching maneuver to be terminated, causes the steering wheel to move to the centered position by controlling the steering motor to move the steered wheels to zero-degree steering angle position.

12. The system of claim 10, wherein executing the automated hitching maneuver further includes:

detecting an exception interruption event that affects execution of the automated hitching maneuver without requiring termination of the automated hitching maneuver; and upon identifying the exception interruption event, ceasing control of the steering system without causing the steering wheel to move to the centered position.

13. The system of claim 12, wherein the controller further:

upon detecting the exception interruption event that affects execution of the automated hitching maneuver without requiring termination of the automated hitching maneuver, maintains an active state while waiting for a user-initiated resume request; and upon detecting the interruption event requiring the automated hitching maneuver to be terminated, enters a deactivated state including terminating the automated hitching maneuver.

14. The system of claim 13, wherein, when receiving the user-initiated resume request the controller reacquires control of the steering system.

15. The system of claim 12, further including a door sensor and a powertrain control system including an accelerator and a gear selector configuring the powertrain control system among park, neutral, drive, and reverse modes, wherein:

the controller classifies the interruption event as the exception interruption event that affects execution of the automated hitching maneuver without requiring termination of the automated hitching maneuver based on any of:
user interference with the steering wheel;
user change in a configuration of the gear selector; or
the door sensor indicating at least one of a plurality of vehicle doors being opened.

16. The system of claim 10, wherein:

the controller identifies the interruption event as the interruption event based on any of:
user cancelation of the automated hitching maneuver; or
the controller identifying a fault within the hitching assistance system.

17. The system of claim 10, further including a system fault sensor and a vehicle speed sensor, wherein:

the controller identifies the interruption event based on one of:
the vehicle speed sensor indicating a vehicle standstill condition prior to completion of the automated hitching maneuver; or
the system fault sensor identifying a system fault.

18. The system of claim 10, wherein:

while executing the automated hitching maneuver, the controller further causes disablement of a vehicle emergency braking system and a rear object detection system; and upon identifying the interruption event, the controller allows for reactivation of the vehicle emergency braking system and the rear object detection system.

19. The system of claim 10, further including an imaging system outputting image data, wherein:

executing the automated hitching maneuver including controlling the steering system is carried out to move the vehicle into an aligned position, where a hitch ball mounted on the vehicle is aligned with a coupler of the trailer, including tracking a position of the coupler relative to the hitch ball in the image data.

20. A method for assisting a vehicle in hitching with a trailer, comprising:

electronically controlling a steering system of the vehicle;

monitoring at least one of the steering system, a powertrain control system of the vehicle, a vehicle door sensor, a user-system input device, a system fault sensor, and a vehicle speed sensor for an interruption event;

detecting the interruption event and identifying the interruption event as one of a standard interruption event or an exception interruption event;

upon identifying the standard interruption event, causing a steering wheel of the vehicle to move to a centered position; and upon identifying the exception interruption event, ceasing control of the steering system without causing the steering wheel to move to the centered position.

* * * * *